United States Patent
Sun et al.

(10) Patent No.: US 12,495,409 B2
(45) Date of Patent: Dec. 9, 2025

(54) SCHEDULING A GROUP OF USER EQUIPMENT BY A NETWORK CELL

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 17/593,416

(22) PCT Filed: Aug. 5, 2020

(86) PCT No.: PCT/CN2020/107109
§ 371 (c)(1),
(2) Date: Sep. 17, 2021

(87) PCT Pub. No.: WO2022/027316
PCT Pub. Date: Feb. 10, 2022

(65) Prior Publication Data
US 2022/0304003 A1   Sep. 22, 2022

(51) Int. Cl.
*H04W 72/121* (2023.01)
*H04L 1/1812* (2023.01)
(Continued)

(52) U.S. Cl.
CPC ......... *H04W 72/121* (2013.01); *H04L 1/1812* (2013.01); *H04L 5/0048* (2013.01);
(Continued)

(58) Field of Classification Search
CPC .. H04W 72/121; H04W 72/20; H04L 1/1812; H04L 5/0048; H04L 5/0098; H04L 1/1861; H04L 1/1893; H04L 5/0055
See application file for complete search history.

(56) References Cited

U.S. PATENT DOCUMENTS

| 11,553,557 B2* | 1/2023 | Noh ................. H04W 72/0446 |
| 2011/0085458 A1* | 4/2011 | Montojo ............... H04L 5/0078 370/252 |

(Continued)

FOREIGN PATENT DOCUMENTS

| CN | 102333381 | 1/2012 |
| CN | 102917463 | 2/2013 |

(Continued)

OTHER PUBLICATIONS

Samsung, "Discussion on CSI-RS Resource Activation"; 3GPP TSG RAN WG1 90bis; R1-1717611; Oct. 13, 2017; 6 sheets.
(Continued)

*Primary Examiner* — Jutai Kao
(74) *Attorney, Agent, or Firm* — Fay Kaplun & Marcin, LLP

(57) ABSTRACT

A cell performs simultaneous scheduling for a group of user equipment (UE). The cell associates a radio network temporary identifier (RNTI) with a group of user equipment (UEs), transmits a signal to the group of UEs, the signal scrambled by the RNTI and including control information and performs an operation indicated in the control information.

17 Claims, 5 Drawing Sheets

(51) Int. Cl.
*H04L 5/00* (2006.01)
*H04W 72/20* (2023.01)
*H04W 72/231* (2023.01)
*H04W 72/30* (2023.01)

(52) U.S. Cl.
CPC .......... *H04L 5/0098* (2013.01); *H04W 72/20* (2023.01); *H04W 72/231* (2023.01); *H04W 72/30* (2023.01)

(56) References Cited

U.S. PATENT DOCUMENTS

| | | |
|---|---|---|
| 2015/0304996 A1 | 10/2015 | Yang et al. |
| 2017/0208610 A1 | 7/2017 | Tang et al. |
| 2017/0289965 A1 | 10/2017 | You et al. |
| 2017/0303241 A1 | 10/2017 | Yang et al. |
| 2018/0098358 A1 | 4/2018 | Rico Alvarino et al. |
| 2019/0098689 A1 | 3/2019 | Wei et al. |
| 2019/0261354 A1 | 8/2019 | Fakoorian et al. |
| 2019/0320469 A1 | 10/2019 | Huang et al. |
| 2019/0349960 A1 | 11/2019 | Li et al. |
| 2020/0059327 A1* | 2/2020 | Kini ............... H04L 5/0055 |
| 2020/0092814 A1 | 3/2020 | Zhou et al. |
| 2020/0187237 A1* | 6/2020 | Su ............... H04W 72/0453 |
| 2020/0196383 A1* | 6/2020 | Tsai ............... H04L 1/1614 |
| 2020/0204293 A1* | 6/2020 | Kim ............... H04L 5/0053 |
| 2020/0245376 A1 | 7/2020 | Cao et al. |
| 2021/0185614 A1 | 6/2021 | Zhou et al. |
| 2021/0367738 A1 | 11/2021 | Taherzadeh Boroujeni et al. |
| 2022/0116859 A1 | 4/2022 | Park et al. |
| 2022/0124782 A1 | 4/2022 | Park et al. |
| 2022/0174745 A1 | 6/2022 | Lee et al. |
| 2022/0225369 A1 | 7/2022 | Park et al. |
| 2022/0376836 A1* | 11/2022 | Cheng ............... H04L 1/1887 |
| 2023/0019024 A1* | 1/2023 | Stare ............... H04W 72/30 |
| 2023/0033910 A1 | 2/2023 | Khoshnevisan et al. |
| 2023/0062788 A1* | 3/2023 | Wei ............... H04L 5/0044 |
| 2023/0147122 A1 | 5/2023 | Canonne-Velasquez et al. |
| 2024/0023039 A1* | 1/2024 | Yeo ............... H04L 5/00 |

FOREIGN PATENT DOCUMENTS

| | | |
|---|---|---|
| CN | 105051697 | 11/2015 |
| CN | 102595624 | 8/2017 |
| CN | 109041249 | 12/2018 |
| CN | 109219138 | 1/2019 |
| CN | 110213819 | 9/2019 |
| CN | 111226408 | 6/2020 |
| EP | 2728928 | 5/2014 |
| EP | 2 903 312 | 8/2015 |
| EP | 3500031 | 6/2019 |
| EP | 3500310 | 6/2019 |
| WO | 2014/082195 | 6/2014 |
| WO | 2016/036452 | 3/2016 |
| WO | 2016/053026 | 4/2016 |
| WO | 2018/037310 | 3/2018 |
| WO | 2019/028890 | 2/2019 |
| WO | 2020/007293 | 1/2020 |

OTHER PUBLICATIONS

Huawei et al.; "Frame and slot structure for sidelink"; 3GPP TSG RAN WG1 Meeting #95; R1-1813552; Nov. 16, 2018; 4 sheets.

Huawei et al.; "Transmission with configured grant in NR unlicensed band"; 3GPP TSG RAN WG1 Meeting #98bis; R1-1910048; Oct. 20, 2019; 22 sheets.

Apple Inc., "Discussion on beam measurement and reporting"; 3GPP TSG RAN WG1 Meeting #92; R1-1802288; Mar. 2, 2018; 8 sheets.

Samsung, "Search Space Design and Transmission Timing for DL Control Signaling", 3GPP TSG RAN WG1 #80, R1-150348, Feb. 8, 2015, 4 sheets.

Anonymous, "How LTE Stuff Works?: RNTIs in 5G NR", Sep. 30, 2019, 7 sheets.

Asustek, "Discussion on clarification of BWP inactivity timer operation", 3GPP RAN WG2, Meeting #110e, R2-2005555, May 22, 2020, 3 sheets.

* cited by examiner

SCHEDULING A GROUP OF USER EQUIPMENT BY A NETWORK CELL

BACKGROUND

A network may transmit downlink control information (DCI) to a user equipment (UE) to schedule a subsequent uplink transmission or a downlink reception. There may be multiple UEs camped on the same cell. Consequently, the cell may have to handle a significant amount of processing and signaling associated with DCI. To reduce latency and signaling overhead, group based scheduling may be implemented by the network for a group of UEs.

SUMMARY

Some exemplary embodiments are related to a method performed by a cell. The method includes associating a radio network temporary identifier (RNTI) with a group of user equipment (UEs), transmitting a signal to the group of UEs, the signal scrambled by the RNTI and including control information and performing an operation indicated in the control information.

Other exemplary embodiments are related to a cell having a processor and a transceiver communicatively connected to the processor. The processor is configured to perform operations that include associating a radio network temporary identifier (RNTI) with a group of user equipment (UEs), transmitting a signal to the group of UEs, the signal scrambled by the RNTI and including control information and performing an operation indicated in the control information.

Still further exemplary embodiments are related to a baseband processor configured to perform operations. The operations include associating a radio network temporary identifier (RNTI) with a group of user equipment (UEs), transmitting a signal to the group of UEs, the signal scrambled by the RNTI and including control information and performing an operation indicated in the control information.

DETAILED DESCRIPTION

Figure 1:
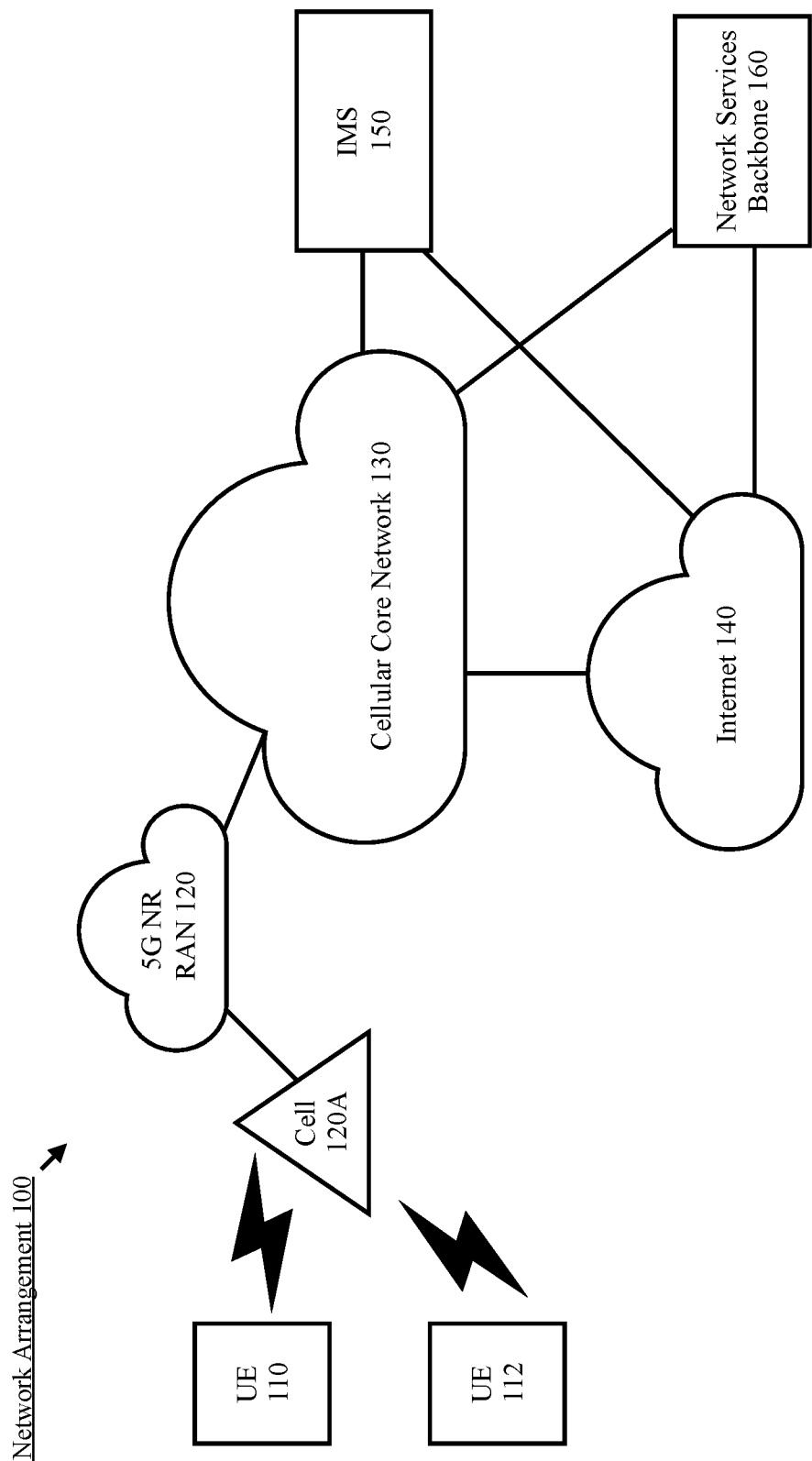
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for implementing group based scheduling for multiple user equipment (UEs). As will be described in more detail below, in a first aspect, the exemplary embodiments relate to the signaling of downlink control information (DCI) to a group of UEs. In a second aspect, the exemplary embodiments relate to the contents of the DCI and the type of UE behavior that may be triggered by the DCI. In a third aspect, the exemplary embodiments relate to hybrid automatic repeat request (HARQ) feedback. The exemplary embodiments include UE and network mechanisms for handling situations related to group based scheduling.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to the network being a fifth generation (5G) new radio (NR) network and a corresponding cell being a next generation Node B (gNB). The 5G NR network may implement group based scheduling for multiple UEs using DCI. However, reference to a 5G NR network and a gNB are merely provided for illustrative purposes. The exemplary embodiments may be utilized with any network and corresponding cell that supports signaling control information to a group of UEs.

The exemplary embodiments are further described with regard to DCI. Those skilled in the art will understand that DCI may refer to control information that indicates that a subsequent transmission and/or reception is to be performed by the UE. To provide an example, the DCI may be transmitted to the UE by a cell on which the UE is currently camped or a cell to which the UE is currently connected via a physical downlink control channel (PDCCH). In this example, the DCI may include scheduling information for downlink data that is to be received via a downlink data channel (e.g., physical downlink shared channel (PDSCH), etc.) or uplink data that is to be transmitted via an uplink data channel (e.g., physical uplink shared channel (PDSCH)). In another example, the DCI may include scheduling information for other control information that is to be received by the UE (e.g., a medium access control (MAC) control element (CE)) or scheduling information for other control information that is to be transmitted by the UE (e.g., a sounding reference signal (SRS)). Thus, the UE may transmit and/or receive a signal in response to the DCI. The above examples are provided for illustrative purposes and are not intended to limit the exemplary embodiments in any way, those skilled in the art will understand the scope of the term "DCI."

The network may transmit DCI that is intended to be received by a group of UEs. Throughout this description, the term "group of UEs" may refer to a set of two or more UEs that are associated with a common identifier. For example, as will be described in more detail below, a radio network temporary identifier (RNTI) may be assigned to a group of UEs. During operation, the network may transmit a signal to the group of UEs that includes DCI and is scrambled by the RNTI. Each UE of the group of UEs may monitor for the DCI using the RNTI assigned to the group of UEs. Accordingly, the network may provide scheduling information to the group of UEs. However, reference to the term "RNTI" is merely provided for illustrative purposes, the exemplary embodiments may utilize any appropriate type of identifier to differentiate the group of UEs from other UEs.

The exemplary embodiments include techniques for implementing group based scheduling. These techniques may reduce the latency and/or signaling overhead associated with providing DCI to multiple UEs. In a first aspect, the exemplary embodiments relate to signaling DCI to a group of UEs. In a second aspect, the exemplary embodiments relate to the contents of the DCI and the type of UE behavior that may be triggered by the DCI. In a third aspect, the exemplary embodiments relate to HARQ feedback corresponding to the DCI. The exemplary embodiments include techniques that may be implemented on both the UE side and the network side. These exemplary techniques may be utilized with other currently implemented group based scheduling techniques, future implementations of group based scheduling techniques or independently from other group based scheduling techniques.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., mobile phones, tablet computers, desktop computers, smartphones, phablets, embedded devices, wearables, Internet of Things (IoT) devices, etc.

In this example, the UEs 110, 112 represent a group of UEs associated with a common identifier (e.g., a RNTI). However, in actual network arrangement, any number of UEs may be configured into any number of groups. Thus, the example of a two UEs 110, 112 is merely provided for illustrative purposes.

The UEs 110, 112 may be configured to communicate with one or more networks. In the example of the network configuration 100, the network with which the UE 110 may wirelessly communicate is a 5G NR radio access network (RAN) 120. However, it should be understood that the UE 110 may also communicate with other types of networks (e.g. 5G cloud RAN, a LTE RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a cell 120A that represents a gNB. However, an actual network arrangement may include any number of different types of cells being deployed by any number of RANs. Thus, the example of a single cell 120A is merely provided for illustrative purposes.

The cell 120A may include one or more communication interfaces to exchange data and/or information with UEs, the corresponding RAN, the cellular core network 130, the internet 140, etc. Further, the cell 120A may include a processor configured to perform various operations. For example, the processor of the cell 120A may be configured to perform operations related to associating an RNTI with a group of UEs, scrambling DCI using the RNTI, transmitting the DCI to the group of UEs, receiving HARQ feedback and the transmission/reception indicated in the DCI. However, reference to a processor is merely for illustrative purposes. The operations of the cell 120A may also be represented as a separate incorporated component of the cell 120A or may be a modular component coupled to the cell 120A, e.g., an integrated circuit with or without firmware. For example, the integrated circuit may include input circuitry to receive signals and processing circuitry to process the signals and other information. In addition, in some examples, the functionality of the processor is split among two or more processors such as a baseband processor and an applications processor. The exemplary embodiments may be implemented in any of these or other configurations of a cell.

The UEs 110, 112 may connect to the 5G NR-RAN 120 via the cell 120A. Those skilled in the art will understand that any association procedure may be performed for the UEs 110, 112 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cells 120A). However, as mentioned above, reference to the 5G NR-RAN 120 is merely for illustrative purposes and any appropriate type of RAN may be used.

In addition to the 5G NR RAN 120 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
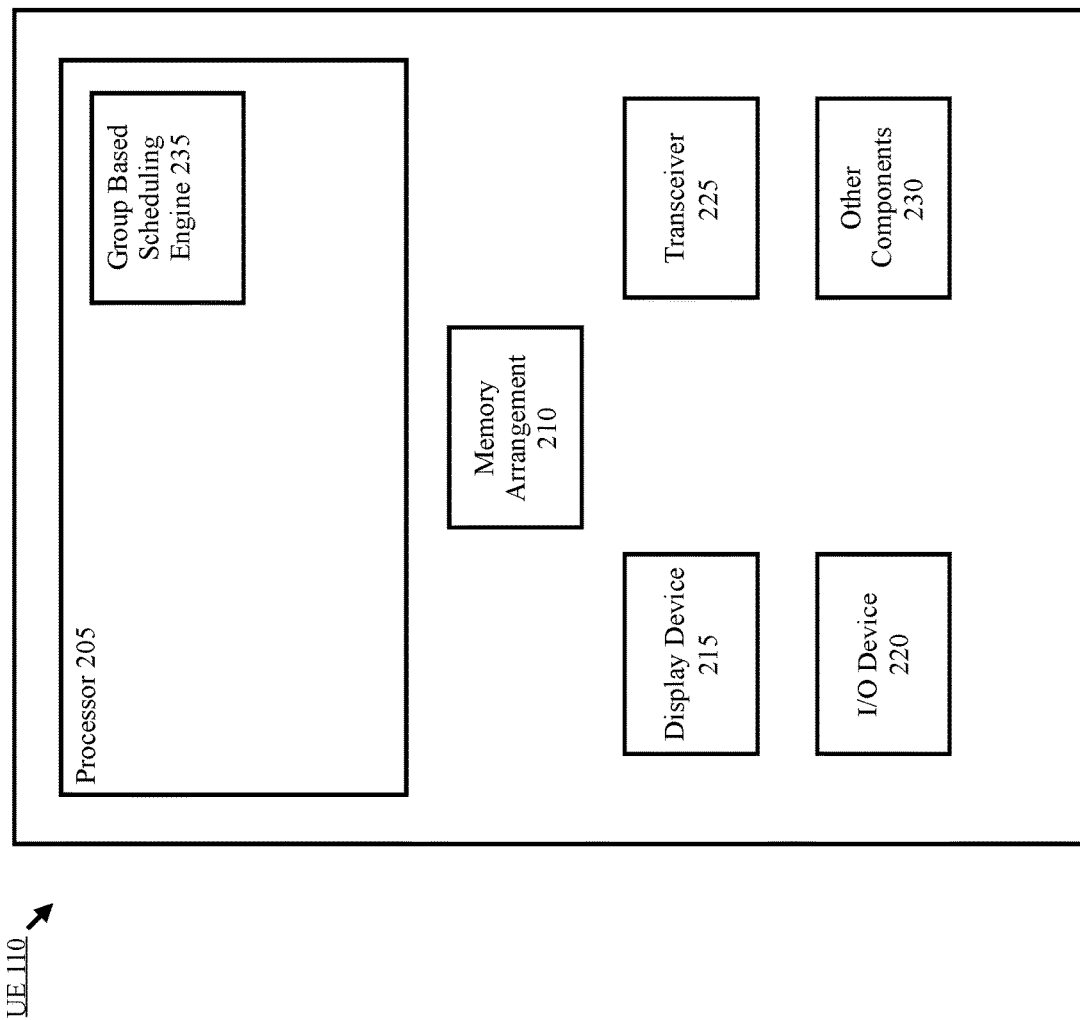
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 235 may include, for example, an audio input device, an audio output device, a power supply, a data acquisition device, ports to electrically connect the UE 110 to other electronic devices, etc. The UE 110 illustrated in FIG. 2 may also represent the UE 112.

The processor 205 may be configured to execute a plurality of engines of the UE 110. For example, the engines may include a group based scheduling engine 235. The group based scheduling engine 235 may perform operations related to identifying an RNTI associated with a group of UEs that includes the UE 110 and using the RNTI to receive DCI that is transmitted to the group of UEs.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
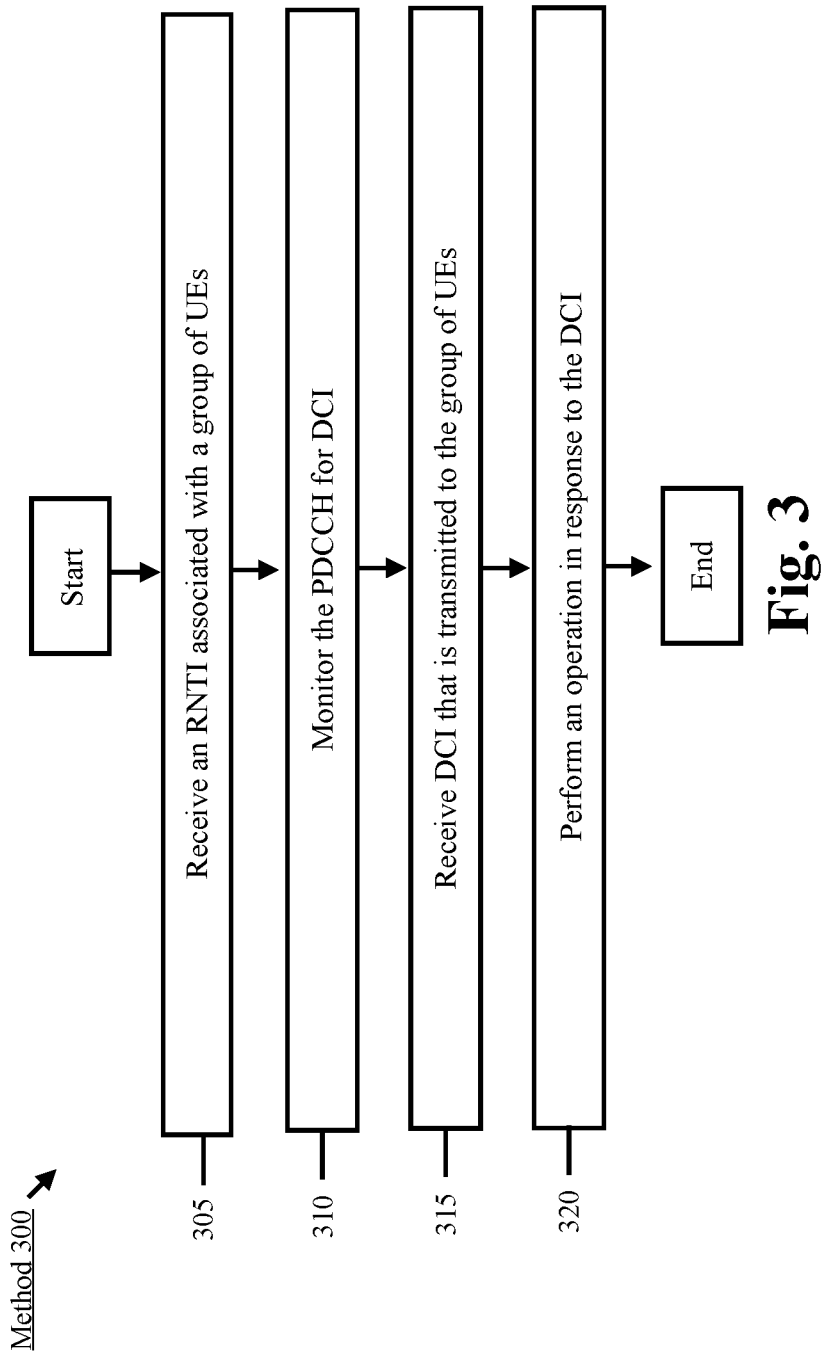
FIG. 3 shows a method for group based scheduling from the perspective of a single UE according to various exemplary embodiments.

FIG. 3 shows a method 300 for group based scheduling from the perspective of a single UE 110 according to various exemplary embodiments. The method 300 will be described with regard to the network arrangement 100 of FIG. 1 and the UE 110 of FIG. 2.

Initially, consider an exemplary scenario in which the UE 110 is camped on the cell 120A. In 305, the UE 110 receives an RNTI associated with a group of UEs.

Those skilled in the art will understand that are various different types of RNTIs. In this example, the RNTI may be used to differentiate a group of UEs from other UEs connected to the same cell. In some embodiments, the RNTI may be an RNTI implemented for group based scheduling. Throughout this description, this type of RNTI may be referred to as an "GC-RNTI." In other embodiments, a slot format indicator RNTI (SFI-RNTI) may be utilized for group based scheduling. Typically, the SFI-RNTI may be used for the notification of slot format information over the PDCCH. Thus, in some exemplary embodiments, the SFI-RNTI may be used in an unconventional manner for group based scheduling. However, any reference to a particular type of RNTI being used for group based scheduling is merely provided for illustrative purposes. The exemplary embodiments may apply to an RNTI specifically configured for group based scheduling, any type of existing RNTI used in an unconventional manner for group based scheduling or any other appropriate type of identifier. Thus, the RNTI as described herein is used to represent any appropriate type of identifier for a group of UEs.

In this example, the RNTI may be provided to the UE 110 via a radio resource control (RRC) signal. However, the exemplary embodiments are not limited to the RNTI being provided via RRC signaling. For instance, the RNTI may be preconfigured or selected from a set of preconfigured values at the UE 110, derived by the UE 110 using a particular algorithm, transmitted to the UE 110 via a third-party or provided to the UE 110 in any other appropriate manner.

In 310, the UE 110 monitors the PDCCH for DCI. This may include the UE 110 utilizing an active mode of data exchange processing during certain instance of time to receive over the air signals, process the received signals and determine whether the received signals include DCI intended for the UE 110. Further, the UE 110 may be configured to monitor the PDCCH in accordance with a discontinuous reception (DRX) cycle, in accordance with a schedule, in response to a predetermined condition or on any other appropriate basis.

The exemplary concepts described herein may be used to provide a variety of different types of control information to the group of UEs. The following configurations are provided as an example of the different types of content that may be scheduled by DCI scrambled with the RNTI associated with the group of UEs. In a first configuration, the RNTI associated with the group of UEs may only be used to schedule the reception of MAC CEs. In a second configuration, the RNTI associated with the group of UEs may be used to schedule the reception of MAC CEs and/or the reception of downlink channels (e.g., PDDCH, PUSCH, etc.). In a third configuration, the RNTI associated with the group of UES may be used to schedule the reception of MAC CEs, the reception of downlink channels and/or the transmission of uplink signaling (e.g., SRS). In a further configuration, the RNTI associated with the group of UES may be used to schedule the reception of MAC CEs, the reception of downlink channels and/or the transmission of uplink channels (e.g. PUSCH, etc.). However, the exemplary embodiments are not limited to any of the exemplary configurations described above. The exemplary concepts described herein may be applicable to any type control information that is to be transmitted to a group of UEs.

In 315, the UE 110 receives DCI that is transmitted to the group of UEs. For example, the cell 120A may transmit a signal that includes DCI and is scrambled by the RNTI associated with the group of UEs. In this example, the monitoring in 310, may include determining whether a signal can be decoded using the RNTI received in 305. Since the group of UEs know the RNTI that is used to scramble the DCI, each UE of the group of UEs may be capable of decoding the scrambled signal. Thus, from the perspective of the cell 120A, transmitting DCI to the group of UEs may include transmitting a signal scrambled by the RNTI associated with the group of UEs. From the perspective of the UE 110, receiving the DCI transmitted to the group of UEs may include successfully decoding the signal using the RNTI associated with the group of UEs. However, the scrambling and decoding operations are beyond the exemplary embodiments. On the network side, any appropriate type of scrambling or similar mechanism may be used. On the UE side, any appropriate type of decoding or similar mechanism may be used.

For a PDCCH monitoring occasion or any other time window during which the UE 110 is configured to monitor for control information, the UE 110 is not expected to decode every signal. For example, in some embodiments, the UE 110 may be expected to decode, at most, one scheduling (e.g., a downlink scheduling or an uplink scheduling) by the RNTI associated with the group of UEs. In other embodiments, the UE may be expected to decode, at most one downlink scheduling and one uplink scheduling by the RNTI associated with the group of UEs. On the network side, information regarding what the UE 110 is expected to decode may be used to improve signaling efficiency and/or reduce signaling overhead. For example, this type of information may provide the basis for the number of signals transmitted to the UE 110 of the group of UEs. On the UE 110 side, information regarding what the UE 110 is expected to decode may be used to improve power consumption. For example, this information may be used to initiate a power saving mode with regard to data exchange processing.

Although not shown in the method 300, the UE 110 may be configured to provide HARQ feedback in response to the DCI received in 315. Specific examples of implementing HARQ feedback for group based scheduling will be described below with regard to the signaling diagram 500 of FIG. 5.

In 320, the UE 110 may perform an operation in response to the DCI. For example, the DCI may schedule the reception of data via a downlink data channel or the transmission of data via an uplink data channel. In another example, the DCI may schedule the reception of a MAC CE. In a further example, the DCI may schedule the transmission of SRS. In another example, the DCI may be used to activate or deactivate a certain feature or mechanism (e.g., SPS PDSCH, configure gran PUSCH, etc.).

Figure 4:
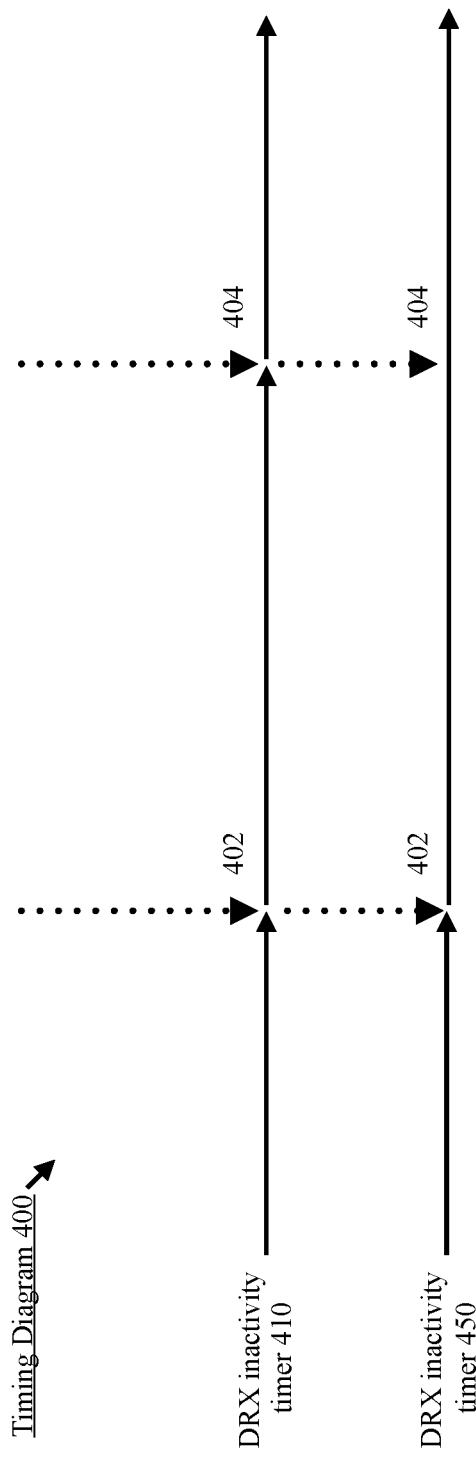
FIG. 4 includes a timing diagram that illustrates how a discontinuous reception (DRX) inactivity timer may be affected by group based scheduling.

In a further example, an inactivity timer for DRX operation may be controlled based on the reception of DCI scrambled by the RNTI associated with the group of UEs. FIG. 4 includes a timing diagram 400 that illustrates how a DRX inactivity timer may be controlled by group based scheduling. However, the following examples are not intended to limit the exemplary embodiments in any way. Instead, the examples shown in the timing diagram 400 are merely provided to illustrate the different ways in which a DRX inactivity timer may be controlled by a signal scrambled with a group RNTI.

The timing diagram 400 illustrates a first DRX inactivity timer 410 and a second DRX inactivity timer 450. In this example, a first UE 110 is equipped with first DRX inactivity timer 410. The first UE 110 is configured to reset the DRX inactivity timer in response to receiving a signal that includes control information and is scrambled by the RNTI associated with the group of UEs. A second UE 112 is equipped with the second DRX inactivity timer 450. The second UE 112 is not configured to reset the DRX inactivity timer in response to receiving a signal that includes control information and is scrambled by the RNTI associated with the group of UEs.

In 402, both the first UE 110 and the second UE 112 receive a signal that includes scheduling information for a subsequent transmission or reception. The signal in 402 is not scrambled with the RNTI associated with the group of UEs. In accordance with DRX inactivity timer operation, both the DRX inactivity timer 410 and the DRX inactivity timer 450 are reset in response to the signal received in 402.

In 404, both the first UE 110 and the second UE 112 receive a signal that includes scheduling information for a subsequent transmission or reception. The signal in 404 is scrambled with the RNTI associated with the group of UEs. Here, only the first UE 110 resets the DRX inactivity timer in response to the signal received in 404. Thus, in some embodiments, the DRX inactivity timer may be reset after decoding the PDCCH scrambled by the RNTI associated with the group of UEs and identifying that a subsequent transmission or reception is to be performed (e.g. DRX inactivity timer 410). In other embodiments, the DRX inactivity timer may not be reset after decoding the PDCCH scrambled by the RNTI associated with the group of UEs and identifying that a subsequent transmission or reception is to be performed (e.g. DRX inactivity timer 450).

Figure 5:
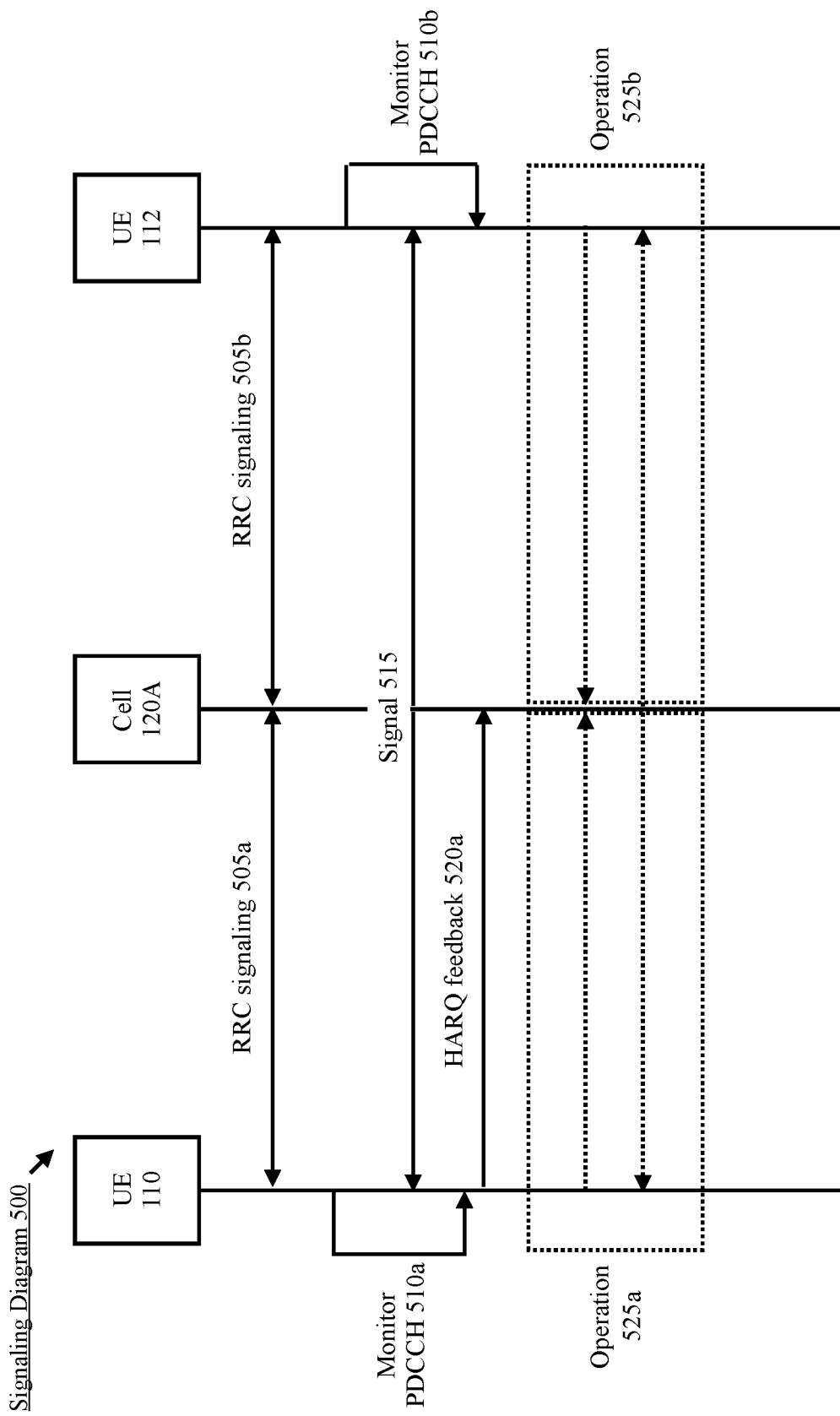
FIG. 5 shows a signaling diagram for group based scheduling according to various exemplary embodiments.

FIG. 5 shows a signaling diagram 500 for group based scheduling according to various exemplary embodiments. The signaling diagram 400 will be described with regard to the network arrangement 100 of FIG. 1, the UE 110 of FIG. 2 and the method 300 of FIG. 3.

The signaling diagram 500 includes the UE 110, the UE 112 and the cell 120A. Initially, consider a scenario in which the UE 110 is camped on the cell 120A and the UE 112 is also camped on the cell 120A.

In 505a, the UE 110 and the cell 120A participate in an RRC signaling exchange. During the signaling exchange in 505a, the UE 110 may receive an indication of the RNTI associated with a group of UEs that includes the UE 110 (e.g., GC-RNTI, SFI-RNTI, etc.). The UE 110 may also receive other configuration information relevant to group based scheduling during the signaling exchange in 505a. For example, the UE 110 may receive parameters for a DRX cycle, an indication of the types of content that may be scrambled by the RNTI, a slot offset for SRS, and parameters for HARQ feedback related to group based scheduling.

In 505b, the UE 112 and the cell 120A also participate in an RRC signaling exchange. The signaling exchange of 505b is substantially similar to the signaling exchange 505a. At this time, the UE 110 and the UE 112 both have independent and distinct connections to the network via the cell 120A. In this example, both the UE 110 and the UE 112 are associated with the same RNTI and corresponding group of UEs.

During operation, the cell 120A and/or the network may determine that one or more UEs are to be associated with one another for group based scheduling in any appropriate manner. That is, the cell 120A and/or the network may assign the UE 110 an RNTI associated with a group of UEs based on any appropriate factor or condition. From the perspective of the network, in some embodiments, the group of UEs may be continuously modified by adding or removing UEs from the group. Further, there may be scenarios in which the cell 120A and/or the network configures a group of UEs but only performs group based scheduling for the when certain predetermined conditions are present. The above examples are not intended to limit the exemplary embodiments in any way. The manner in which the network configures a group of UEs or determines when to implement group based scheduling is beyond the scope of the exemplary embodiments. The exemplary embodiments may apply to a group of UEs being configured in any appropriate manner and group based scheduling being performed for any appropriate reason.

In 510a, the UE 110 monitors the PDCCH for DCI. For example, during the RRC signaling exchange in 505a, the network may configure the UE 110 with one or more monitoring occasions during which the UE 110 is to utilize an active mode of data exchange processing to monitor for control information. Similarly, in 510b, the UE 112 monitors the PDCCH for DCI.

In 515, the cell 120A transmits a signal to the group of UEs. The signal may include control information and may be scrambled using the RNTI associated with the group of UEs.

In some embodiments, the group based scheduling may be used for SP-SRS activation and deactivation. For example, the control information transmitted in 515 may schedule the reception of a MAC CE configured for SP-SRS activation or deactivation. In response to the subsequently received MAC CE, the group of UEs may activate or deactivate the SP-SRS resource set indicated in the MAC CE.

In some embodiments, the group based scheduling may be used for aperiodic SRS (AP-SRS) transmission triggering. For example, an SRS request may be triggered by DCI format 0_1, 0_2, 1_1, 1_2 and 2_3. This type of DCI may be scrambled by the RNTI associated with the group of UEs and transmitted during 515. The UEs 110, 112 may decode the DCI during their respective monitoring occasions shown in 510a, 510b. In response, the UEs 110, 112 may be triggered to transmit the corresponding AP-SRS resource set based on the SRS request.

The SP-SRS resource set slot offset may also be indicated in the DCI. For example, a predetermined value or indictor may be included in a slot offset field in the DCI. In response to identifying the predetermined value or indictor, the UE 110 may use the slot offset previously configured by RRC signaling. In another example, the slot offset may be explicitly indicated in the DCI. In a further example, the slot offset may be derived based at least, in part, on the DCI.

In some embodiments, the group based scheduling may be used for configured grant PUSCH activation or deactivation. Similarly, the group based scheduling may be used for SPS PDSCH activation or deactivation. Unlike the MAC CE activation/deactivation mentioned above, in this example, the PDCCH itself may be configured to trigger configured grant PUSCH and/or SPS PDSCH activation/deactivation.

To support group based configured grant PUSCH and/or SPS PDSCH, the following configurations may be implemented. Conventionally, this type of control information may be provided to a UE via a configured scheduling RNTI (CS-RNTI). Specific examples that include utilizing aspects of the GC-RNTI and/or the CS-RNTI are provided below.

A first configuration includes implementing a new group based RNTI for configured grant PUSCH and/or SPS PDSCH activation/deactivation. Throughout this description, this RNTI may be referred to as a "CS-GC-RNTI." Thus, during RRC signaling exchanges in 505a, 505b, the UEs 110, 112 may receive one or more RNTIs, e.g., GC-RNTI, CS-RNTI and/or CS-GC-RNTI.

A second configuration includes combining the CS-RNTI and the GC-RNTI to have an equivalent RNTI of GC-RNTI+CS-RNTI where (+) represents a modular 2 addition. Thus, during RRC signaling exchanges in 505a, 505b, the UEs 110, 112 may receive multiple RNTIs, e.g., GC-RNTI and CS-RNTI. The UEs 110, 112 may then use both of these RNTIs to decode an indication of configured grant PUSCH and/or SPS PDSCH activation/deactivation on the PDCCH.

A third configuration includes using CS-RNTI to scramble the cyclic redundancy check (CRC) portion of the DCI and GC-RNTI to scramble a payload portion of the DCI (or vice versa). Thus, during RRC signaling exchanges in 505a, 505b, the UEs 110, 112 may receive multiple RNTIs, e.g., GC-RNTI and CS-RNTI. The UEs 110, 112 may then use both of these RNTIs to decode an indication of configured grant PUSCH and/or SPS PDSCH activation/deactivation on the PDCCH.

A fourth configuration includes using GC-RNTI as the explicit payload of the DCI. Thus, during RRC signaling exchanges in 505a, 505b, the UEs 110, 112 may receive multiple RNTIs, e.g., GC-RNTI and CS-RNTI. The UEs 110, 112 may then use the CS-RNTI to decode an indication of configured grant PUSCH and/or SPS PDSCH activation/deactivation on the PDCCH. The payload of the GC-RNTI may then indicate to the UEs 110, 112 that this indicate is for group based scheduling. This may indicate to the UEs 110, 112 to behave in accordance with the group based scheduling parameters.

As indicated above, the signal transmitted in 515 may be used to schedule the reception of a MAC CE. Thus, group based scheduling may be used to support various functionality that may be available via the use of a MAC CE. For example, the group based scheduling may be used to transmit a MAC CE to the group of UEs that is configured to change PDCCH beams for all UEs in the group of UEs. In another example, the group based scheduling may be used to transmit a MAC CE to the group of UEs that is configured to change a PDSCH transmission configuration indicator (TCI) table for all UEs in the group of UEs. In a further example, the group based scheduling may be used to transmit a MAC CE to the group of UEs that is to activate semi-persistent (SP) zero power (ZP) channel state information (CSI) reference signal (RS) (SP-ZP-CSI-RS) for all UEs in the group of UEs. In a further example, the group based scheduling may be used to transmit a MAC CE to the group of UEs that is to activate SP non-zero power (NZP) CSI-RS (SP-NZP-CSI-RS) for all UEs in the group of UEs. In another example, the group based scheduling may be used to transmit a MAC CE to the group of UEs that is configured to change PUCCH beams for all UEs in the group of UEs.

In some embodiments, the DCI transmitted in 515 may be configured to trigger dormancy mode or may be used to schedule the reception of an indication that triggers dormancy mode. Those skilled in the art will understand that dormancy mode relates to a UE power saving mode of data exchange processing with regard to one or more secondary cells (SCells). Thus, group based scheduling may be used to request that UEs in the group of UEs operate in dormancy mode with regard to the one or more indicated cells.

In 520a, the UE 110 may transmit HARQ feedback to the cell 120A. HARQ feedback may be incorporated into group based scheduling in any of a variety of different ways. Specific examples of implementing HARQ feedback for group based scheduling will be provided below.

In some embodiments, HARQ acknowledgement (ACK) feedback is not required. In other embodiments, HARQ ACK feedback may only be implemented for certain types of control information. For example, the UE 110 may transmit HARQ ACK feedback in response to receiving configured grant PUSCH activation/deactivation, receiving SPS PDSCH activation/deactivation and/or receiving a MAC CE.

In further embodiments the parameters for HARQ ACK feedback may be provided during RRC signaling. These parameters may indicate whether HARQ ACK feedback is to be provided and/or the conditions that may trigger HARQ ACK feedback. For instance, the network may selectively implement HARQ ACK feedback under certain condition and elect not to implement HARQ ACK feedback under other conditions. In another embodiment, the RRC signaling may be used to implement HARQ ACK feedback for only a subset of the UEs in the group of UEs. An example of this embodiment is shown in the signaling diagram 500. Here, the UE 110 is included in the subset of UEs of the group of UEs and thus, the UE 110 provide HARQ ACK feedback in 520a. The UE 112 is not included in the subset of UEs and thus, the UE 112 does not provide HARQ ACK feedback despite successfully receiving the signal transmitted in 515.

In some embodiments, all UEs included in the group of UEs may provide HARQ ACK feedback. In other embodiments, as indicated above, only a subset of UEs in the group of UEs may be configured to provide HARQ ACK feedback. The subset may be determined by the UEs based on criterion such as, but not limited to, downlink reference signal receive power (RSRP), downlink reference signal receive quality (RSRQ), a parameter indicated a distance relative to the currently camped or connected cell, a priority order, etc.

In some embodiments, only negative acknowledgments (NAKs) are to be provided as feedback, only ACKs are to be provided as feedback or both ACKs and NACKs are to be provided as feedback.

In 525a, the UE 110 performs an operation in response to the DCI. For example, the UE 110 may perform a transmission and/or a reception in accordance with the scheduling control information. Although shown outside of the monitoring occasion 510a in the signaling diagram 500, the exemplary embodiments are not limited to this type of scenario. In an actual operating scenario, the operation in 525a may be performed at any time subsequent to the reception of the control information.

In 525b, the UE 112 performs an operation in response to the DCI. The operation performed in 525b may be substantially similar to the operation performed in 525b. For example, if the DCI in 515 is for SP-SRS activation, the UEs 110, 112 may transmit SRS in 525a, 525b. If the DCI in 515 is for SP-SRS deactivation, the UEs 110, 112, may deactivate a mode of operation related to providing SP-SRS in 525a, 525b. In another example, if the DCI in 515 is for AP-SRS transmission, the UEs 110, 112 may transmit SRS in 525a, 525b. In a further example, if the DCI in 515 schedules the reception of a MAC CE, the UEs 110, 112 may receive the corresponding MAC CE in 525a, 525b.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a cell:
   associating a first radio network temporary identifier (RNTI) and a second RNTI with a group of user equipment (UEs);
   generating, for transmission, radio resource control (RRC) messages to one or more UEs from the group of UEs, the RRC messages comprising the first RNTI, the second RNTI and parameters for hybrid automatic repeat request (HARQ) feedback related to group based scheduling;
   generating, for transmission, a signal to the group of UEs, the signal including control information scheduling a physical downlink shared channel (PDSCH), wherein the one or more UEs of the group of UEs is to decode the signal based on the first RNTI combined with the second RNTI using a modular 2 addition; and
   generating, for transmission, a medium access control (MAC) control element (CE) on the scheduled PDSCH, wherein the MAC CE indicates a change to a PDSCH transmissions configuration indicator (TCI) table for the group of UEs.

2. The method of claim 1, wherein all of the UEs in the group of UEs are configured to provide hybrid automatic request (HARQ) feedback associated with the signal.

3. The method of claim 1, wherein a subset of the UEs in the group of UEs are configured to provide hybrid automatic request (HARQ) feedback in response to the signal.

4. The method of claim 1, wherein the group of UEs are configured to provide the cell with one of i) hybrid automatic request (HARQ) feedback associated with the signal only when the signal is received, ii) HARQ feedback associated with the signal only when the signal is not received and iii) HARQ feedback associated with the signal when the signal is received and when the signal is not received.

5. The method of claim 1, wherein the first RNTI is a configured scheduling RNTI (CS-RNTI) and wherein the signal includes a payload of a third different RNTI.

6. The method of claim 1, wherein the signal corresponds to one of i) configure grant physical uplink shared channel (PUSCH) activation, ii) configure grant PUSCH deactivation, iii) semi-persistent-scheduled physical downlink shared channel (SPS-PDSCH) activation and iv) SPS-PDSCH deactivation.

7. The method of claim 6, wherein the signal is scrambled by a configured scheduling RNTI (CS-RNTI).

8. The method of claim 1, wherein the first RNTI is a Slot Format Indication RNTI (SFI-RNTI).

9. The method of claim 1, wherein the control information schedules a medium access control (MAC) control element (CE) for semi-persistent sounding reference signal (SP-SRS) activation or SP-SRS deactivation.

10. The method of claim 1, wherein the control information triggers each UE of the group of UEs to transmit aperiodic sounding reference signal (AP-SRS) and wherein performing the operation includes receiving AP-SRS.

11. A cell, comprising:
    a processor configured to perform operations comprising:
    associating a first radio network temporary identifier (RNTI) and a second RNTI with a group of user equipment (UEs);
    generating, for transmission, radio resource control (RRC) messages to one or more UEs from the group of UEs, the RRC messages comprising the first RNTI, the second RNTI and parameters for hybrid automatic repeat request (HARQ) feedback related to group based scheduling;
    generating, for transmission, a signal to the group of UEs, the signal including control information scheduling a physical downlink shared channel (PDSCH), wherein the one or more UEs of the group of UEs are to decode the signal based on the first RNTI combined with the second RNTI using a modular 2 addition; and generating, for transmission, a medium access control (MAC) control element (CE) on the scheduled PDSCH, wherein the MAC CE indicates a change to a PDSCH transmissions configuration indicator (TCI) table for the group of UEs; and a transceiver communicatively connected to the processor.

12. The cell of claim 11, wherein a subset of the UEs in the group of UEs are configured to provide hybrid automatic request (HARQ) feedback in response to the signal.

13. The cell of claim 11, wherein the group of UEs are configured to provide the cell with one of i) hybrid automatic request (HARQ) feedback associated with the signal only when the signal is received, ii) HARQ feedback associated with the signal only when the signal is not received and iii) HARQ feedback associated with the signal when the signal is received and when the signal is not received.

14. The cell of claim 11, wherein the signal corresponds to one of i) configure grant physical uplink shared channel (PUSCH) activation, ii) configure grant PUSCH deactivation, iii) semi-persistent-scheduled physical downlink shared channel (SPS-PDSCH) activation and iv) SPS-PDSCH deactivation.

15. A baseband processor configured to perform operations comprising:

associating a first radio network temporary identifier (RNTI) and a second RNTI with a group of user equipment (UEs);

generating, for transmission, radio resource control (RRC) messages to one or more UEs from the group of UEs, the RRC messages comprising the first RNTI, the second RNTI and parameters for hybrid automatic repeat request (HARQ) feedback related to group based scheduling;

generating, for transmission, a signal to the group of UEs, the signal including control information scheduling a physical downlink shared channel (PDSCH), wherein the one or more UEs of the group of UEs is to decode the signal based on the first RNTI combined with the second RNTI using a modular 2 addition; and generating, for transmission, a medium access control (MAC) control element (CE) on the scheduled PDSCH, wherein the MAC CE indicates a change to a PDSCH transmissions configuration indicator (TCI) table for the group of UEs.

16. The baseband processor of claim 15, wherein the group of UEs are configured to provide a cell with one of i) hybrid automatic request (HARQ) feedback associated with the signal only when the signal is received, ii) HARQ feedback associated with the signal only when the signal is not received and iii) HARQ feedback associated with the signal when the signal is received and when the signal is not received.

17. The baseband processor of claim 15, wherein the signal corresponds to one of i) configure grant physical uplink shared channel (PUSCH) activation, ii) configure grant PUSCH deactivation, iii) semi-persistent-scheduled physical downlink shared channel (SPS-PDSCH) activation and iv) SPS-PDSCH deactivation.

* * * * *